United States Patent
Hara

(10) Patent No.: US 9,602,388 B2
(45) Date of Patent: *Mar. 21, 2017

(54) SESSION TERMINAL APPARATUS AND NETWORK SESSION SYSTEM

(71) Applicant: Yamaha Corporation, Hamamatsu-shi, Shizuoka-ken (JP)

(72) Inventor: Takahiro Hara, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/460,098

(22) Filed: Aug. 14, 2014

(65) Prior Publication Data

US 2014/0359122 A1 Dec. 4, 2014

Related U.S. Application Data

(63) Continuation of application No. 13/109,916, filed on May 17, 2011, now Pat. No. 8,838,835.

(30) Foreign Application Priority Data

May 18, 2010 (JP) ................................ 2010-113791

(51) Int. Cl.
*G06F 15/16* (2006.01)
*H04L 12/727* (2013.01)
(Continued)

(52) U.S. Cl.
CPC ......... *H04L 45/121* (2013.01); *G10H 1/0066* (2013.01); *H04L 12/1827* (2013.01); *H04L 43/16* (2013.01); *G10H 2240/175* (2013.01)

(58) Field of Classification Search
CPC .......... G10H 1/0058; G10H 2240/175; G10H 1/0066; G10H 2240/305; H04L 12/1827; H04L 45/121; H04L 43/16
(Continued)

(56) References Cited

U.S. PATENT DOCUMENTS

| 4,215,619 A | 8/1980 | Budelman et al. |
| 5,623,112 A | 4/1997 | Ito et al. |

(Continued)

FOREIGN PATENT DOCUMENTS

| JP | 2005-195982 A | 7/2005 |
| JP | 2007-178860 A | 7/2007 |

(Continued)

OTHER PUBLICATIONS

Notice of Allowability mailed Aug. 22, 2014, for U.S. Appl. No. 13/109,916, filed May 17, 2011, 5 pages.

(Continued)

*Primary Examiner* — Tauqir Hussain
(74) *Attorney, Agent, or Firm* — Morrison & Foerster LLP

(57) ABSTRACT

A session terminal apparatus constitutes a network session system together with another session terminal apparatus. In the session terminal apparatus, a back performance instruction part instructs reproduction of back performance information. A back performance control part transmits the back performance information, when the reproduction thereof is instructed by the back performance instruction part, to another session terminal apparatus, and controls a performance reproduction part to start reproducing the back performance information when a monitor delay time corresponding to a communication delay time between the session terminal apparatus and another session terminal apparatus has elapsed after the reproduction of the back performance information was instructed.

8 Claims, 5 Drawing Sheets

(51) Int. Cl.
*H04L 12/18* (2006.01)
*G10H 1/00* (2006.01)
*H04L 12/26* (2006.01)

(58) Field of Classification Search
USPC ........................................................ 709/224
See application file for complete search history.

(56) References Cited

U.S. PATENT DOCUMENTS

| | | | |
|---|---|---|---|
| 5,714,703 A * | 2/1998 | Wachi | G10H 7/004 |
| | | | 84/603 |
| 5,744,739 A | 4/1998 | Jenkins | |
| 5,777,252 A * | 7/1998 | Tada | G10H 1/361 |
| | | | 434/307 A |
| 5,811,707 A | 9/1998 | Kakehashi et al. | |
| 5,952,597 A * | 9/1999 | Weinstock et al. | 84/609 |
| 5,981,859 A * | 11/1999 | Suzuki | G10H 7/006 |
| | | | 84/601 |
| 5,990,406 A | 11/1999 | Nakamura et al. | |
| 6,068,489 A * | 5/2000 | Nagata | G10H 1/365 |
| | | | 381/63 |
| 6,166,314 A | 12/2000 | Weinstock et al. | |
| 6,248,944 B1 | 6/2001 | Ito | |
| 6,376,758 B1 * | 4/2002 | Yamada et al. | 84/612 |
| 6,415,326 B1 * | 7/2002 | Gupta et al. | 709/231 |
| 6,495,747 B2 * | 12/2002 | Shimaya et al. | 84/477 R |
| 6,518,978 B1 * | 2/2003 | Omata et al. | 715/723 |
| 6,586,667 B2 * | 7/2003 | Morita | 84/659 |
| 6,622,171 B2 * | 9/2003 | Gupta et al. | 709/231 |
| 6,737,572 B1 | 5/2004 | Jameson et al. | |
| 6,868,440 B1 * | 3/2005 | Gupta et al. | 709/219 |
| 6,985,966 B1 * | 1/2006 | Gupta et al. | 709/248 |
| 7,189,912 B2 * | 3/2007 | Jung | 84/610 |
| 7,194,686 B1 * | 3/2007 | Suzuki et al. | 715/716 |
| 7,200,813 B2 | 4/2007 | Funaki | |
| 7,237,254 B1 * | 6/2007 | Omoigui | 725/94 |
| 7,302,490 B1 * | 11/2007 | Gupta et al. | 709/231 |
| 7,313,808 B1 * | 12/2007 | Gupta et al. | 725/89 |
| 7,470,856 B2 * | 12/2008 | Jung et al. | 84/645 |
| 7,685,111 B2 * | 3/2010 | Muroi et al. | 707/999.003 |
| 7,750,230 B2 | 7/2010 | Akazawa | |
| 7,777,122 B2 * | 8/2010 | Hurwitz et al. | 84/609 |
| 7,795,524 B2 * | 9/2010 | Arai et al. | 84/612 |
| 7,863,513 B2 * | 1/2011 | Ishii et al. | 84/645 |
| 7,964,780 B2 | 6/2011 | Hotta et al. | |
| 8,013,232 B2 | 9/2011 | Hara | |
| 8,017,854 B2 * | 9/2011 | Foster et al. | 84/616 |
| 8,076,564 B2 * | 12/2011 | Applewhite | 84/477 R |
| 8,079,907 B2 * | 12/2011 | Egozy | 463/42 |
| 8,080,722 B2 * | 12/2011 | Applewhite et al. | 84/609 |
| 8,217,251 B2 * | 7/2012 | Anderson | 84/601 |
| 8,367,921 B2 * | 2/2013 | Evans et al. | 84/609 |
| 8,838,835 B2 | 9/2014 | Hara | |
| 2003/0101862 A1 | 6/2003 | Furukawa | |
| 2003/0131716 A1 | 7/2003 | Aoki et al. | |
| 2004/0025670 A1 * | 2/2004 | Nagashima et al. | 84/610 |
| 2005/0235810 A1 | 10/2005 | Aoki et al. | |
| 2005/0241464 A1 | 11/2005 | Aoki et al. | |
| 2006/0218239 A1 * | 9/2006 | Umezawa | G10H 1/0058 |
| | | | 709/209 |
| 2007/0089593 A1 | 4/2007 | Hara | |
| 2008/0190271 A1 | 8/2008 | Taub et al. | |
| 2010/0212478 A1 | 8/2010 | Taub et al. | |
| 2011/0289208 A1 | 11/2011 | Hara | |

FOREIGN PATENT DOCUMENTS

| | | |
|---|---|---|
| JP | 2008-253440 A | 10/2008 |
| JP | 4259329 B2 | 4/2009 |

OTHER PUBLICATIONS

Notice of Reason for Rejection issued Nov. 27, 2014, for Japanese Patent Application No. 2010-113791, with English translation, six pages.
Corrected Notice of Allowance mailed May 20, 2014, for U.S. Appl. No. 13/109,916, filed May 17, 2011, 8 pages.
Non-Final Office Action mailed Mar. 11, 2013, for U.S. Appl. No. 13/109,916, filed May 17, 2011, 11 pages.
Non-Final Office Action mailed Oct. 28, 2013, for U.S. Appl. No. 13/109,916, filed May 17, 2011, 6 pages.
Notice of Allowance mailed Jul. 9, 2013, for U.S. Appl. No. 13/109,916, filed May 17, 2011, 11 pages.
Notice of Reason for Rejection mailed Mar. 11, 2014, for JP Application No. 2010-113791, with English translation, four pages.

\* cited by examiner

FIG.1 (1)
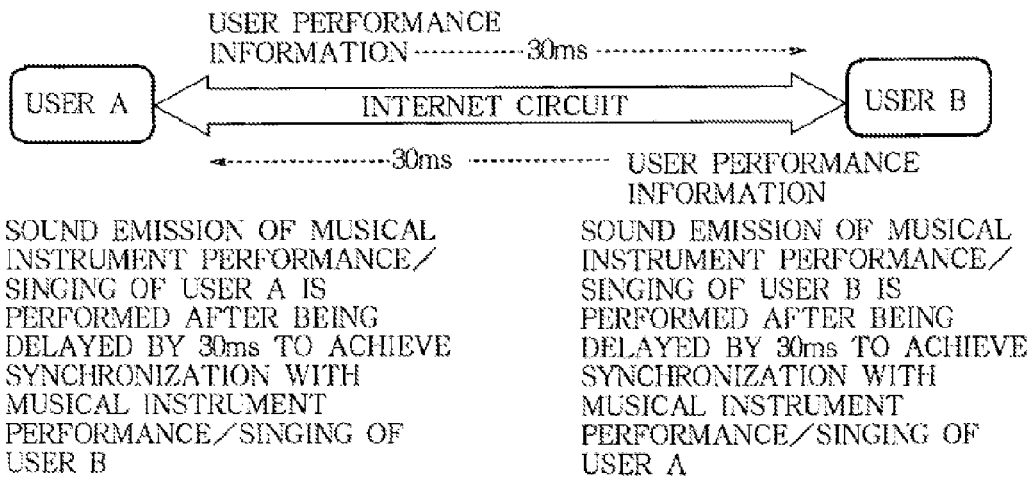
FIG.1 (2)
(a) CONCEPTUAL DIAGRAM
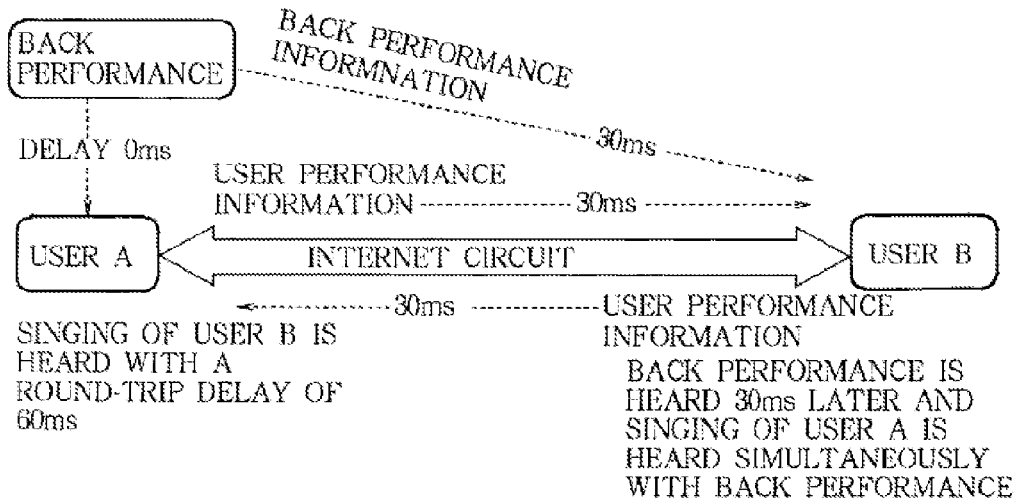
(b) CHRONOLOGICAL DIAGRAM
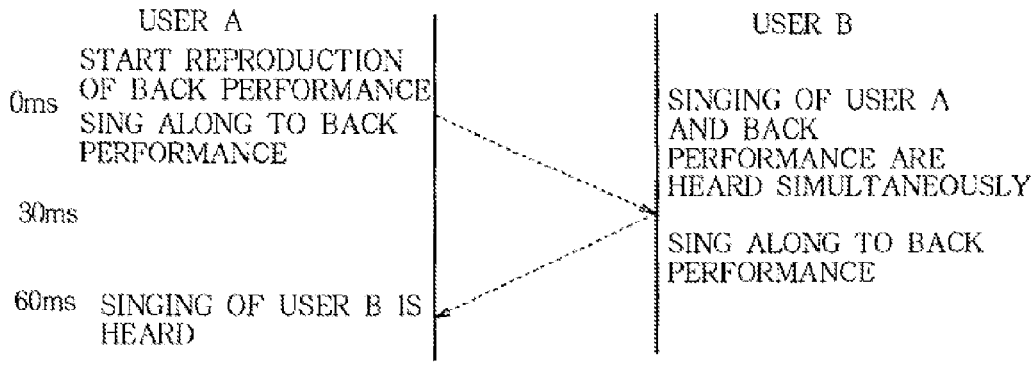

FIG.2 (1)
DELAY Tm EQUAL TO DELAY Tc OF
NETWORK IS APPLIED TO USER A
BACK PERFORMANCE INFORMATION IS IMMEDIATELY
TRANSMITTED TO USER B WITHOUT DELAY
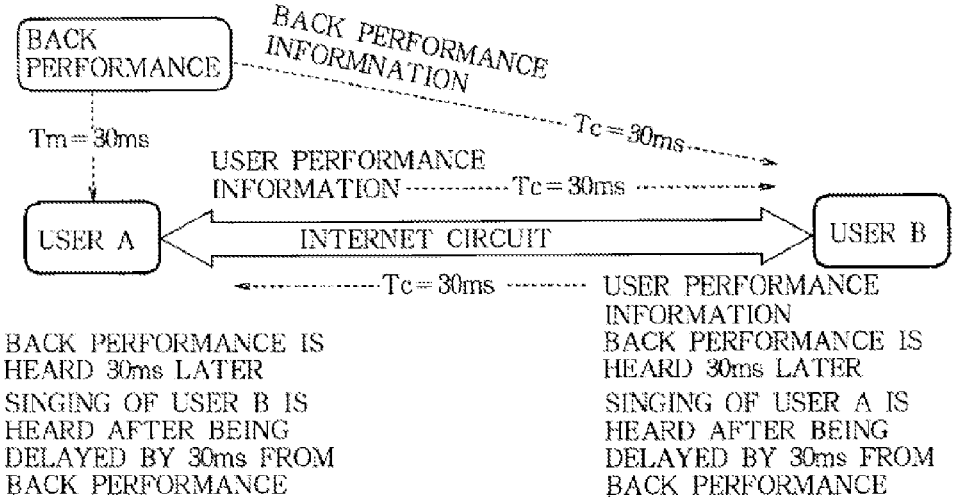
FIG.2 (2)
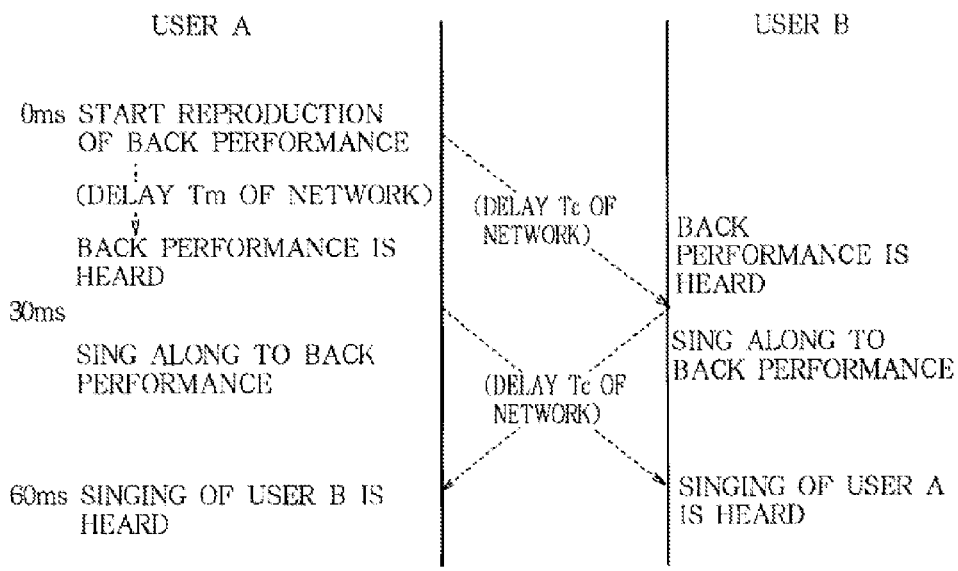

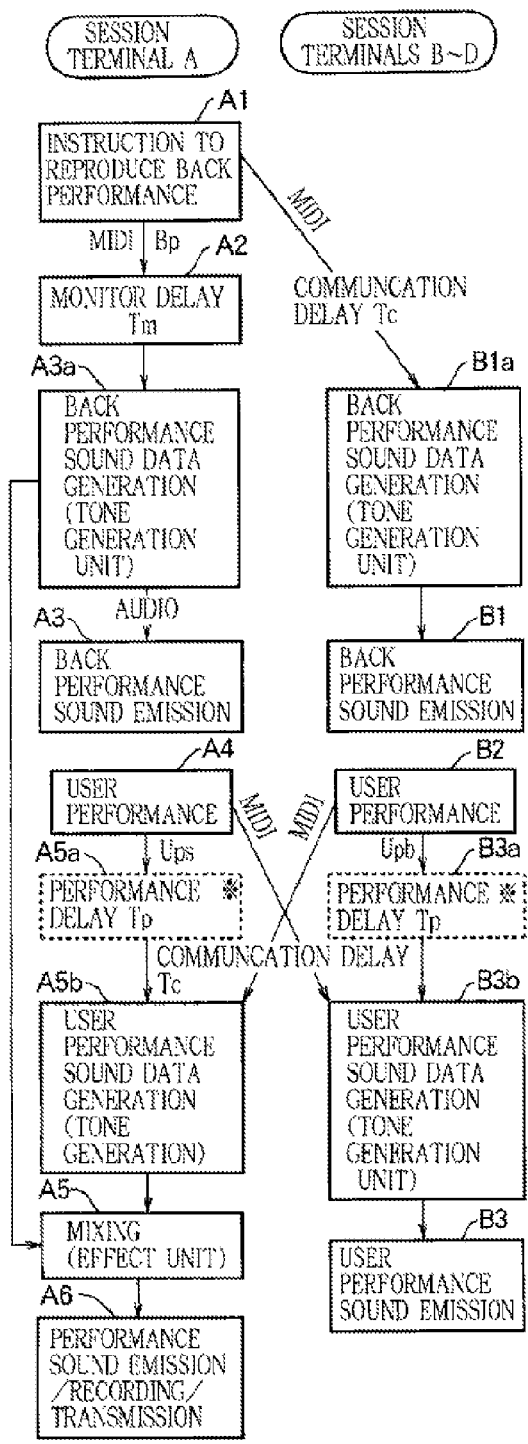
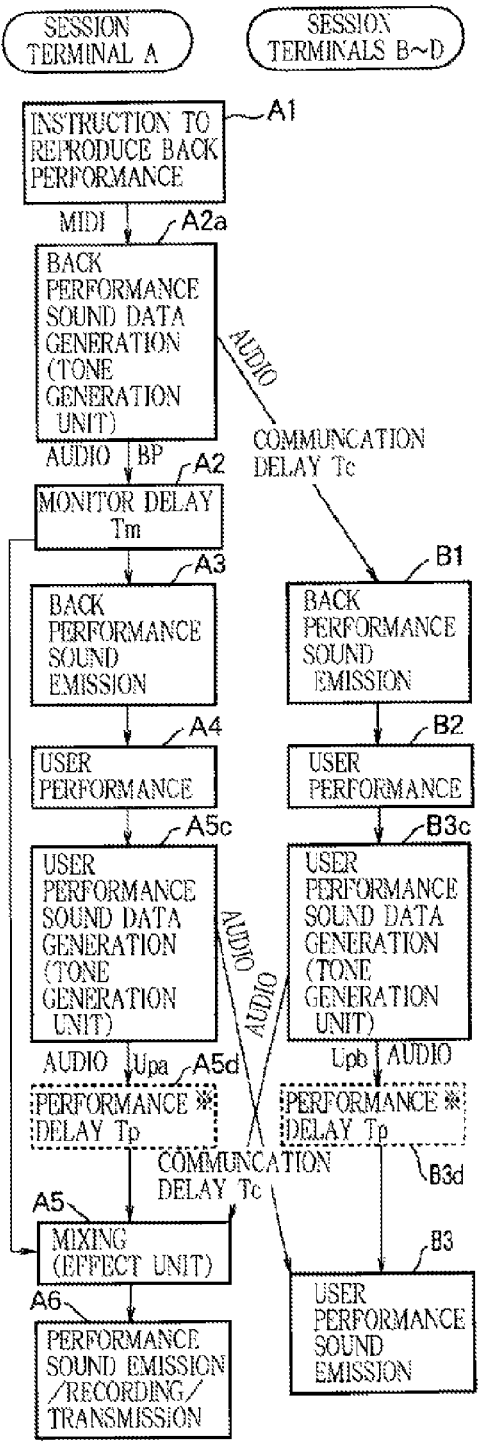
FIG.5(1)  FIG.5(2)

SESSION TERMINAL APPARATUS AND NETWORK SESSION SYSTEM

CROSS-REFERENCE TO RELATED APPLICATIONS

This application is a continuation application of U.S. patent application Ser. No. 13/109,916, filed May 17, 2011, which claims the benefit of Japanese Patent Application No. 2010-113791, filed May 18, 2010. The contents of the above applications are hereby incorporated by reference herein in their entirety for all purposes.

BACKGROUND OF THE INVENTION

Technical Field of the Invention

The present invention relates to a network session system that performs session such as joint performance of a plurality of electronic music terminals connected through a communication network such as the Internet.

Description of the Related Art

A technology for enabling musical session such as joint performance (ensemble) of musical instruments or chorus such as duet through the Internet is known in the art. For example, in an ensemble system described in Japanese Patent Publication No. 4259329, performance information representing a performance operation of a terminal (A) of a user is transmitted to another terminal (B) and is provided to a musical sound generation unit in the terminal (A) of the user after being delayed by a predetermined time, thereby allowing a musical sound generated according to the performance operation of the terminal (A) to be simultaneously emitted at the two terminals (A, B).

When session such as musical instrument ensemble or duet is conventionally performed through the Internet in an environment in which there is a certain amount of communication delay (for example, 30 ms) between two user terminals A and B as shown in FIG. 1(1), the user terminal A performs sound emission of performance such as musical instrument performance or singing of the user A with a delay of 30 ms to achieve synchronization with sound emission of performance such as musical instrument performance or singing of the user terminal B, and the user terminal B also performs sound emission of performance such as musical instrument performance or singing of the user B with a delay of 30 ms to achieve synchronization with sound emission of performance such as musical instrument performance or singing of the user terminal A. That is, in the conventional network session technology, one terminal performs session by transmitting performance data representing performance such as musical instrument performance or singing played on the terminal to another terminal and by receiving performance data representing performance such as musical instrument performance or singing played on said another terminal, and then simultaneously performing sound emission of the performance data of the terminal and sound emission of the performance data of said another terminal (and said another terminal also performs session in the same manner).

Here, the terminal delays the sound emission timing of performance of the terminal by a time corresponding to a communication delay so as to synchronize the performance sound of the terminal with the performance sound received from said another terminal. However, since the terminal user hears musical instrument performance or singing of the terminal user with a delay, the terminal user feels strangeness (or discomfort) and thus performers or singers cannot pleasantly play performance or singing.

For example, as shown in FIG. 1(2), an uneven delay occurs in some application case where users desire to sing a duet or to play a musical instrument ensemble along to back performance such as karaoke that is played on a terminal. For example, in the case where a user A of a user terminal A plays back performance and both the users A and B sing a duet on the user terminals A and B, the user B hears the back performance with a delay of 30 ms and hears the singing (or vocal) of the user A simultaneously with the back performance. However, the user A hears the singing of the user B with a round-trip delay of 60 ms from the back performance while hearing the back performance with a delay of 0 ms (i.e., without delay) as shown in FIG. 1(2)(a). This can be represented in a chronological manner as shown in FIG. 1(2)(b).

Session and duet could be performed without serious problems even in an environment where a considerable delay exists over the Internet in case that only one-way delay is caused at both parties as shown in FIG. 1(1). However, if there is a round-trip delay as shown in FIG. 1(2), the users hear transmitted performance unnaturally such that they feel strangeness, making it difficult to play joint performance.

SUMMARY OF THE INVENTION

In view of the above circumstances, it is an object of the invention to provide a network session system that can lessen strangeness of performance due to communication delay when musical session is performed through a communication network.

Simply stated, in the network session system according to the invention, a delay of Tm=30 ms, which corresponds to a one-way network delay of Tc=30 ms, is forcibly applied to back performance sounding on the terminal (i.e., the user terminal A) on which back performance is being played as shown in FIG. 2(1) to solve the problems illustrated in FIG. 1. Specifically, the user terminal A measures a communication delay time Tc between the user terminal A and the user terminal B that is another session member in the communication network such as the Internet, and starts reproducing back performance information after a delay time (monitor delay time) Tm of 30 ms, which is equal to the measured delay time Tc of 30 ms, has elapsed from issuance of an instruction to reproduce the back performance information while immediately starting transmitting the back performance information to the user terminal B without a delay, permitting a communication delay Tc of 30 ms between the terminals A and B as shown in FIG. 2(2). This allows the back performance to be heard at the user terminal B with the delay time Tc of 30 ms and also allows the back performance to be heard at the user terminal A with the delay time Tc of 30 ms. Accordingly, for example, when the users A and B start singing upon start of back performance at the user terminals A and B, respectively, the singing of the user A is heard at the user terminal B with the delay Tc of 30 ms from the back performance and the singing of the user B is also heard at the user terminal A with the delay Tc of 30 ms from the back performance.

By forcibly applying the monitor delay Tm of 30 ms, which is equal to the network delay Tc of 30 ms, to back performance at the user terminal A on which the back performance is being played in the above manner, it is possible to allow back performance to be simultaneously heard at both the terminals of the users A and B and also to equalize delays at both the user terminals A and B to "30 ms", unlike the conventional technology in which delay is predominant in the user terminal A in the conventional technology. The network session system according to the invention is especially effective in a network delay environment (for example, an environment with a one-way delay in a range of about 25 ms to 50 ms) in which performance fails with a round-trip delay although session such as duet may be achieved with a one-way delay. The invention is expected to provide a useful network session system since a one-way delay in the range of about 25 ms to 50 ms occurs when session is performed over the Internet using a general fixed line such as an ADSL or optical line currently available in this country.

As a terminal for solving the above problems, the invention provides a session terminal apparatus (TMa) that constitutes a network session system together with another session terminal apparatus (TMb, . . . , TMd) communicably connected through a communication network (CN), the session terminal apparatus (TMa) including a performance reproduction part (9) that reproduces performance information, a communication part (10) that communicates with said another session terminal apparatus (TMb, . . . , TMd), a back performance instruction part (A1) that instructs reproduction of back performance information (Bp), a back performance control part (A1-A3) that transmits the back performance information (Bp), whose reproduction is instructed by the back performance instruction part (A1), to said another session terminal apparatus (TMb, . . . , TMd) through the communication part (10) and that controls the performance reproduction part (9) to start reproducing the back performance information (Bp) when a monitor delay time (Tm) corresponding to a communication delay time (Tc) between the session terminal apparatus (TMa) and said another session terminal apparatus (TMb, . . . , TMd) has elapsed after the reproduction was instructed, a user performance input part (6, 7, 13 and 14; A4) that inputs user performance information (Upa) based on performance which is performed by a user along with the reproduction of the back performance information, and a user performance control part (A4-A6) that transmits the user performance information (Upa) input through the user performance input part (6, 7, 13 and 14; A4) to said another session terminal apparatus (TMb, . . . , TMd) through the communication part (10) and that controls the performance reproduction part (9) to reproduce the user performance information (Upa) and another user performance information (Upb, . . . , Upd) received from said another session terminal apparatus (TMb, . . . , TMd) through the communication part (10). Symbols in parentheses indicate reference numerals or locations in the embodiments. The same is true for the following description.

Preferably, the back performance control part (A1-A3) determines the monitor delay time (Tm) corresponding to the communication delay time (Tc) that includes a pure communication delay time (Tn) caused by communicating the back performance information (Bp) between the session terminal apparatus (TMa) and said another session terminal apparatus (TMb), a transmitting operation delay time (Tds) caused by transmitting operation of the back performance information in the session terminal apparatus (TMa), and a receiving operation delay time (Tdr) caused by receiving operation of the back performance information (Bp) in said another session terminal apparatus (TMb).

Preferably, transmitting operation delay time (Tds) includes a buffer operation delay time caused by operation of a transmitting buffer (BUs) used for transmitting of the back performance information, and the receiving operation delay time (Tdr) includes another buffer operation delay time caused by operation of a receiving buffer (BUr) used for receiving of the back performance information.

Preferably, the back performance control part (A1-A3) measures the pure communication delay time (Tn) by transmitting a measurement packet to said another session terminal apparatus (TMb) through the communication network and by receiving a response packet returned from said another session terminal apparatus (TMb).

Preferably, the session terminal apparatus constitutes the network session system together with a plurality of other session terminal apparatuses (TMb-TMd) communicably connected through the communication network with different communication delay times, wherein the back performance control part (A1-A3) determines the monitor delay time (Tm) corresponding to a mean value of the different communication delay times observed between the session terminal apparatus (TMa) and respective one of the other session terminal apparatuses (TMb-TMd).

Preferably, the back performance control part (A1-A3) determines the monitor delay time (Tm) corresponding to a maximum value of the different communication delay times (Tc) observed between the session terminal apparatus (TMa) and respective one of the other session terminal apparatuses (TMb-TMd).

Preferably, the back performance control part (A1-A3) determines the monitor delay time (Tm) to a predetermined threshold value in case that the maximum value of the different communication delay times (Tc) exceeds the predetermined threshold value (Td).

Preferably, the back performance control part (A1-A3) determines different monitor delay times for respective ones of the other session terminal apparatuses (TMb-TMd) in correspondence to the different communication delay times observed between the session terminal apparatus (TMa) and the respective one of the other session terminal apparatuses (TMb-TMd).

Preferably, the session terminal apparatus further includes a headphone that is attached to a head of the user and that receives sounds of the back performance information (Bp) reproduced by the performance reproduction pert (9), whereby the user can perform live performance in synchronization with the reproduction of the back performance information (Bp).

Preferably, the user performance control unit (A4-A6) controls the performance reproduction part (9) to reproduce the user performance information (Upa) with a performance delay time after the user performance information (Upa) was inputted to the user performance input part (6, 7, 13 and 14; A4).

As a system for solving the above problems, the invention provides a network session system including a first session terminal apparatus (TMa) and a second session terminal apparatus (TMb, . . . , TMd) communicably connected through a communication network (CN), the first session terminal apparatus (TMa) including a first terminal performance reproduction part (9) that reproduces performance information, a first terminal communication part (10) that communicates with the second session terminal apparatus (TMb, . . . , TMd), a back performance instruction part (A1) that instructs reproduction of back performance information (Bp), a first terminal back performance control part (A1-A3) that transmits the back performance information (Bp), whose reproduction is instructed by the back performance instruction part (A1), to the second session terminal apparatus (TMb, . . . , TMd) through the first terminal communication part (10) and that controls the first terminal performance reproduction part (9) to start reproducing the back performance information (Bp) when a monitor delay time (Tm) corresponding to a communication delay time between the first session terminal apparatus (TMa) and the second session terminal apparatus (TMb, . . . , TMd) has elapsed after the reproduction of the back performance information was instructed, a first terminal user performance input part (6, 7, 13 and 14; A4) that inputs first terminal user performance information (Upa) based on performance which is performed by a first session terminal apparatus (TMa) user along with the reproduction of the back performance information, and a first terminal user performance control part (A4-A6) that transmits the first terminal user performance information (Upa) input through the first terminal user performance input part (6, 7, 13 and 14; A4) to the second session terminal apparatus (TMb, . . . , TMd) through the first terminal communication part (10) and that controls the first terminal performance reproduction part (9) to reproduce the first terminal user performance information (Upa) and second terminal user performance information (Upb, . . . , Upd) received from the second session terminal apparatus (TMb, . . . , TMd) through the first terminal communication part (10), and the second session terminal apparatus (TMb, . . . , TMd) including a second terminal performance reproduction part (9) that reproduces performance information, a second terminal communication part (10) that communicates with the first session terminal apparatus (TMa), a back performance part (B1, . . . , D1) that controls the second terminal performance reproduction part (9) to reproduce back performance information (Bp) received from the first session terminal apparatus (TMa) through the second terminal communication part (10), a second terminal user performance input part (6, 7, 13 and 14; B2, . . . , D2) that inputs second terminal user performance information (Upb, . . . , Upd) based on performance which is performed by a second session terminal apparatus user along with the reproduction of the back performance information, and a second terminal user performance control part (B2-B3, . . . , D2-D3) that transmits the second terminal user performance information (Upb, . . . , Upd) input through the second terminal user performance input part (6, 7, 13 and 14; B2, . . . , D2) to the first session terminal apparatus (TMa) through the second terminal communication part (10) and that controls the second terminal performance reproduction part (9) to reproduce the second terminal user performance information (Upb, . . . , Upd) and the first terminal user performance information (Upa) received from the first session terminal apparatus (TMa) through the second terminal communication part (10).

In the network session system according to the invention, back performance information (Bp) prepared in a session terminal apparatus (TMa) which is referred to as a first session terminal apparatus among a plurality of session terminal apparatuses (TM: TMa, TMb, . . . , TMd), which constitute the system and are connected through a communication network (CN), is used to perform back performance in the system and is transmitted from the first session terminal apparatus (TMa) to other session terminal apparatuses (TMb, . . . , TMd) which are referred to as second session terminal apparatuses. On the second session terminal apparatuses (TMb, . . . , TMd), terminal users of the second session terminal apparatuses can play user performance such as musical instrument performance or singing (B2-B3, . . . , D2-D3) while listening to back performance sounds (B1, . . . , D1) generated based on the back performance information (Bp). On the first session terminal apparatus (TMa), a terminal user of the first session terminal apparatus can also play user performance such as musical instrument performance or singing (A4) while listening to a back performance sound (A3) generated based on the back performance information (Bp). Here, reproduction of the back performance information (Bp), i.e., generation of the back performance sound, is delayed (A2-A3) by a monitor delay time (Tm) corresponding to about one half of a round-trip communication delay between the first session terminal apparatus (TMa) and the second session terminal apparatuses (TMb, . . . , TMd), i.e., corresponding to a one-way communication delay time (Tc). In addition, when user performance is played, user performance information (Upa) of the first session terminal apparatus (TMa) is transmitted to the second session terminal apparatuses (TMb-TMd) and user performance information (Upb, . . . , Upd) of the second session terminal apparatuses (TMb-TMd) is transmitted back to the first session terminal apparatus (TMa), hence performance of the first session terminal user is heard (B3, . . . , D3) at the second session terminal apparatuses (TMb, . . . , TMd) after being delayed by a one-way communication delay time (Tc) from back performance (B1, . . . , D1) and performance of the second session terminal users is also heard (A5-A6) at the first session terminal apparatus (TMa) after being delayed by the communication delay time (Tc) from sounding of back performance (A3). Thus, according to the invention, it is possible to equalize delays of reproduction of back performance information at the first and second session terminal apparatuses and to lessen strangeness of performance due to communication delay which is predominant in the first session terminal apparatus in the conventional technology.

BRIEF DESCRIPTION OF THE DRAWINGS

FIGS. 1(1) and 1(2) illustrate problems of a network session system;

FIGS. 2(1) and 2(2) illustrate an overview of a solution according to the invention;

FIGS. 5(1) and 5(2) illustrate various embodiments of a network session system according to the invention.

DETAILED DESCRIPTION OF THE INVENTION

Overview of System Configuration

Figure 3:
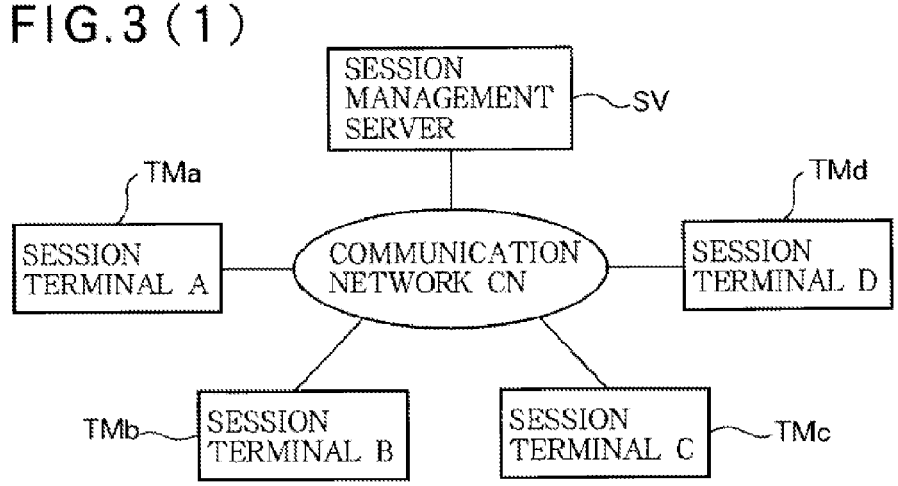
FIGS. 3(1) and 3(2) illustrate a configuration of a network session system according to an embodiment of the invention.
Figure 3:
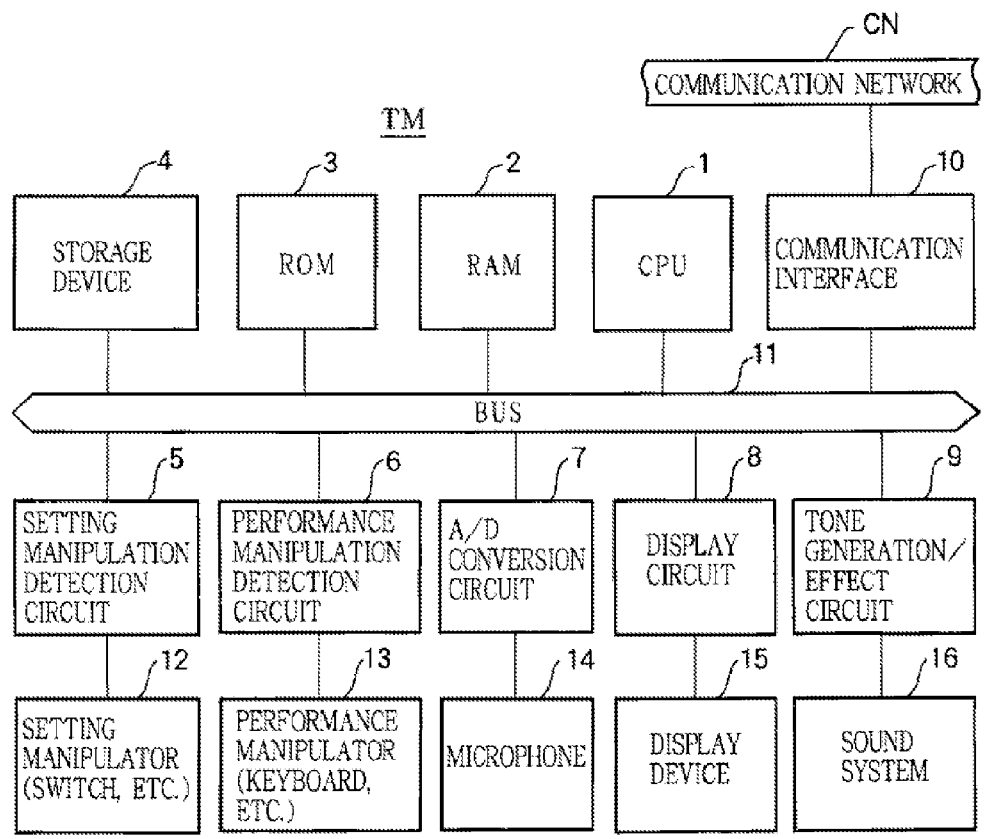

FIGS. 3(1) and 3(2) illustrate a system configuration of a network session system according to an embodiment of the invention. As shown in FIG. 3(1), the network session system includes a session management server SV and a plurality of session terminals TM (TMa to TMd). Here, the symbol "TM" represents a session terminal apparatus. The session management server SV supports connection between the session terminals TM which are session members. For example, the session management server SV performs connection procedures between the session terminals TM prior to initiation of a network session. After connections between the session terminals TM, for example, between the session terminals TMa to TMd are established, performance information such as MIDI data or audio data is transmitted and received between the session terminals TMa to TMd without passing through the session management server SV. A description of more detailed operations of the session management server SV is omitted herein since operations of the session management server SV are well known.

Each of the plurality of session terminals TMa to TMd, which are members of the network session, is an electronic musical apparatus that can perform musical instrument performance and/or karaoke. The session terminals TMa to TMd also include session terminals having a back performance function for musical instrument performance and karaoke. One session terminal, which is arbitrarily selected when the members are configured among the session terminals having a back performance function, is referred to as a "first session terminal" and the back performance function of the first session terminal can be used for back performance of the network session at that time. In this case, back performance information of the first session terminal is reproduced by the first session terminal and is also transmitted to and reproduced by other session terminals that are referred to as "second session terminals". In the following description, it is assumed that the session terminal TMa operates as the first session terminal and the other session terminals TMb to TMd operate as the second session terminals. In addition, the session terminals TMa to TMd are referred to as "session terminals A to D", respectively.

FIG. 3(2) is a block diagram illustrating an exemplary hardware configuration of each session terminal apparatus included in the network session system. Each session terminal TM included in the network session system according to an embodiment of the invention is a type of computer having an electronic musical information processing function, and an electronic musical apparatus such as a personal computer in which an electronic musical instrument or musical information processing application has been installed may be used as the session terminal TM. As shown in FIG. 3(2), the session terminal TM includes a Central Processing Unit (CPU) 1, a Random Access Memory (RAM) 2, a Read Only Memory (ROM) 3, a storage device 4, a setting manipulation detection circuit 5, a performance manipulation detection circuit 6, an Analog to Digital (A/D) conversion circuit 7, a display circuit 8, a tone generation/effect circuit 9, and a communication interface (I/F) 10. These components are connected through a bus 11.

The CPU 1 constitutes a data processor together with the RAM 2 and the ROM 3 and performs a variety of information processes including a network session process according to a control program including a network session program. The RAM 2 is used as a storage management region for accessibly storing data required for these processes or a work area for temporarily storing various data. Various control programs including a network session program, preset data, and the like are previously stored in the ROM 3 in order to perform such processes.

The storage device 4 includes a storage medium such as a Hard Disk (HD), a Flexible Disk (FD), a Compact Disk (CD), a Digital Versatile Disc (DVD), and a semiconductor memory such as a flash memory and a driver of the storage medium. A control program, MIDI performance data including back performance data, and the like may be stored in the storage device 4. The storage medium may be detachable and may also be embedded in the session terminal TM.

The setting manipulation detection circuit 5 constitutes a setting manipulation unit (panel manipulation unit) together with a setting manipulator (panel manipulator) 12 such as a switch or a mouse. The setting manipulation detection circuit 5 detects manipulation of the setting manipulator 12 and inputs setting manipulation information corresponding to the detected setting manipulation to the data processor (1-3), and the data processor performs various setting based on the setting manipulation information. The performance manipulation detection circuit 6 constitutes a musical instrument performance input unit together with a performance manipulator 13 such as a keyboard, and detects manipulation performed on the performance manipulator 13 by the terminal user and inputs performance manipulation information corresponding to the detected performance manipulation to the data processor. The data processor creates performance data in a MIDI format (referred to as "MIDI performance data") based on the performance manipulation information and transmits the created performance data to the tone generation/effect circuit 9. The MIDI format is an event description format that represents the content of musical instrument performance as a series of events. The A/D conversion circuit 7 constitutes a vocal input unit together with a microphone 14, and converts a vocal sound signal input from the microphone 14 into a digital signal and inputs the digital signal to the data processor. The data processing unit transmits performance data in an audio format which represents a vocal sound as a waveform (referred to as "audio performance sound data") to the tone generation/effect circuit 9. The display circuit 8 includes a display device 15 such as an LCD for displaying various screens required to perform various setting and to input performance such as musical instrument performance or singing (or vocal), an indicator/lamp (not shown), and the like, and controls display and lighting of these components according to an instruction from the data processing unit and performs display support operations associated with setting, performance input, and the like.

The tone generation/effect circuit 9 includes a tone generation unit for generating audio data from the MIDI-format data and an effect unit for performing a variety of audio data processing including DSP. The tone generation/effect circuit 9 functions as a performance player. For example, the tone generation unit generates audio performance sound data based on MIDI performance data obtained from performance manipulation information from the performance manipulation detection circuit 6 or based on MIDI performance data obtained from the ROM 3, the storage device 4, or the communication interface 10, and the effect unit generates audio output data by performing specific effect imparting or mixing on audio performance sound data input from the microphone 14, audio performance sound data generated by the tone generation unit, or audio performance sound data obtained from the communication interface 10 or the like. A sound system 16 includes a D/A converter, an amplifier, a speaker (including a headphone), and the like and generates a musical sound (a musical instrument performance sound or a vocal sound) based on the audio output data from the tone generation/effect circuit 9.

The communication interface 10 includes one or a plurality of interfaces such as a music-dedicated wired interface such as a MIDI-dedicated wired interface, a general-purpose local area wired interface such as an IEEE1394 interface, a general-purpose network interface such as Ethernet (registered trademark), a general-purpose local area wireless interface such as a wireless LAN or a Bluetooth (registered trademark) interface. The communication interface 10 may exchange MIDI performance data or audio performance sound data with another session terminal via a Communication Network (CN) such as the Internet and may receive a control program, data, or the like from an external device such as a server computer or the like and store the received program, data, or the like in the storage device 4.

[Exemplary Operation of Network Session]

The vocal input unit 7 and 14 is unnecessary when an electronic musical instrument is used as the session terminal TM and karaoke is not performed, and the musical instrument performance input unit 6 and 13 is unnecessary when a PC having a musical information processing application is used as the session terminal TM and only karaoke is performed. In addition, the hardware configuration of the session management server SV is almost the same as that of FIG. 3(2), except that the musical instrument performance input unit 6 and 13, the performance player 9 and 16, and the like are unnecessary.

[Exemplary Operation of Network Session]

Figure 4:
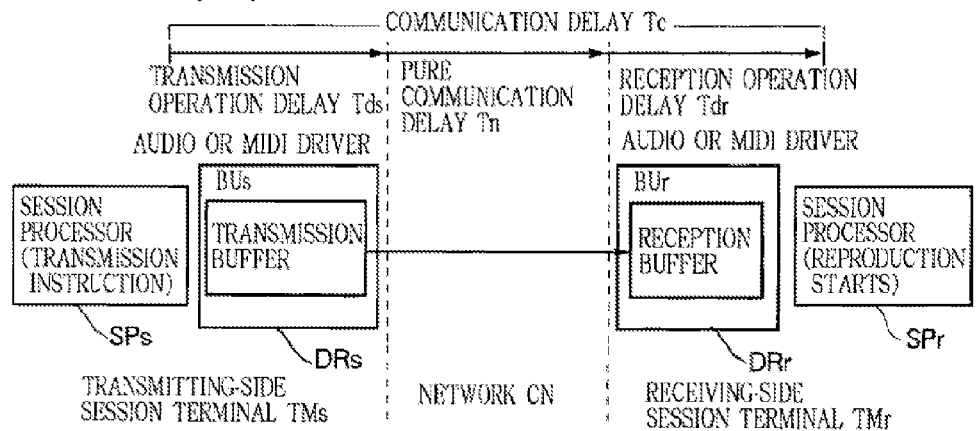
FIGS. 4(1) and 4(2) illustrate an operation of a network session system according to an embodiment of the invention.
Figure 4:
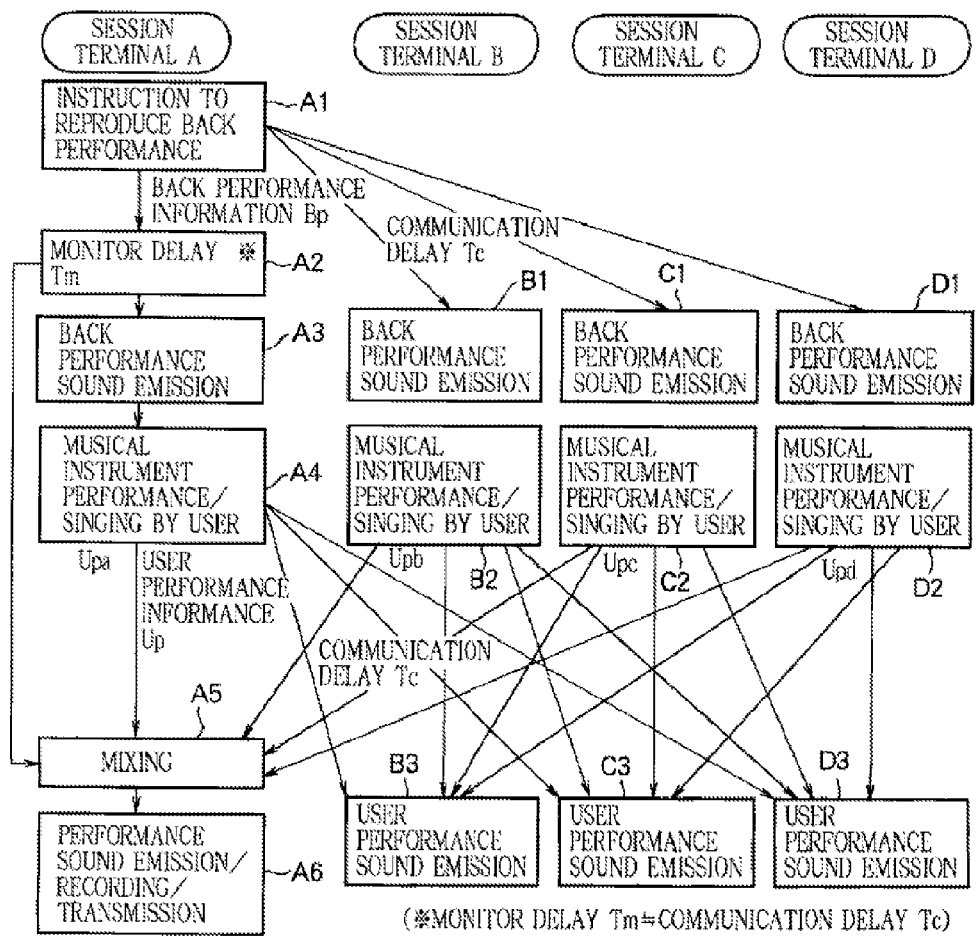

FIGS. 4(1) and 4(2) illustrate operation of a network session system according to an embodiment of the invention. A description will first be given of an overview of exchange of information in the network session system. In this system, back performance information data, which is reproduced in a session terminal A functioning as a first session terminal (A1-A3), is also transmitted as back performance information Bp to other session terminals B to D, which are session members, in a MIDI performance data format without being converted or after being converted into an audio performance sound data format. When the back performance information Bp has been transmitted from the session terminal A to the session terminals B to D, the back performance information Bp is reproduced in the session terminals B to D (B1-D1) while respective terminal users play musical instrument performance and/or singing along to the reproduction of the back performance information (audio) Bp (B2 to D2). User performance data generated by each of the session terminals B to D, which represents content of the musical instrument performance and/or singing, is MIDI performance data or audio performance sound data in the case of musical instrument performance and is audio performance sound data in the case of singing. The user performance data generated by the session terminals B to D is transmitted to the session terminal A as user performance information Upb to Upd of the session terminals B to D.

While the terminal user of the session terminal A plays musical instrument performance and/or singing along to back performance played on the session terminal A (A4), the session terminal A mixes the musical instrument performance and/or singing with musical instrument performance and/or singing of the other session terminals B to D (A5 and A6). Specifically, in the effect unit of the tone generation/effect circuit 9, the performance information Bp and Upa representing the content of the back performance and the content of the musical instrument performance and/or singing played by the user is mixed with the user performance information Upb to Upd received from the other session terminals B to D and the mixed performance information is then reproduced. Session music containing singings (or vocals) and/or musical instrument performances that are played on the session terminals A to D along to the back performance is completed in this manner.

Ensemble data representing the completed session music may be reproduced only at the session terminal A and may be recorded and may also be transmitted to another device (not shown) through the communication network CN. In an exemplary ensemble transmission method, the recorded file is uploaded to a file share server or is transmitted to a live broadcast viewing terminal in real time using an online live broadcast application (A6). In addition, ensemble data may not only be recorded and transmitted as sound data but may also be recorded or transmitted in combination with a moving image as video data.

The network session system is implemented in an environment where a certain amount of communication delay exists between each of the session terminals A to D. Here, as shown in FIG. 4(1), a communication delay time Tc between each session terminal is the sum of a pure communication delay time (net communication delay time) Tn on the network CN between transmitting-side and receiving-side session terminals Tms and Tmr and transmitting-side and receiving-side operation delay times Tds and Tdr of performance data transmission and reception drivers DRs and DRr of the two terminals TMs and Tmr. Here, the performance data transmission and reception drivers DRs and DRr are audio drivers in the case of audio performance sound data and MIDI drivers in the case of MIDI performance data. Specifically, the proportion of an operation delay time of a transmission buffer BUs in a performance data transmission driver DRs that receives a transmission instruction from a transmitting-side session processor SPs is high in the transmission operation delay time Tds, and the proportion of an operation delay time of a reception buffer BUr in a performance data reception driver DRr that performs operation until a receiving-side session processor SPr starts reproduction after the performance data is received is high in the reception operation delay time Tdr.

In this system, the session terminal A, which functions as the first session terminal and contains back performance data, may measure the pure communication delay time Tn between the session terminal A and the other session terminals B to D by performing communication with the other session terminals B to D that function as the second session terminals and that use the back performance data from the session terminal A. Specifically, the session terminal A transmits a delay measurement packet including a packet transmission time ta1 to each of the session terminals B to D and each of the session terminals B to D transmits a response packet including a time tk1, at which the delay measurement packet is received, and a time tk2, at which the response packet is transmitted, back to the session terminal A. Here, the subscript "k" is a corresponding one of "b", "c", and "d" which represent the terminals B, C, and D, respectively. The session terminal A calculates a round-trip delay time dk between the session terminal A and each of the session terminals B to D based on a time ta2 at which the response packet is received and the times ta1, tk1, and tk2 using Equation <1>.

$$dk=(ta2-ta1)-(tk2-tk1) \qquad <1>$$

Here, the times ta1 and ta2 are managed in the session terminal A and the times tk1 and tk2 are managed in the session terminals B to D. Therefore, absolute times measured by the terminals A to D need not match each other. That is, it is unnecessary to consider the absolute times of the session terminals A to D since the (relative) time difference between packet transmission and packet reception at the session terminal A and the (relative) time difference between packet reception and packet transmission at each of the session terminals B to D are calculated as can be understood from Equation <1>.

½ of the round-trip delay time dk obtained in this manner may be regarded as a pure one-way communication delay time Tn. Strictly speaking, the communication delay times of the forward and return packet paths are not necessarily equal. However, in this embodiment, ½ of the round-trip delay time is employed as the pure one-way communication delay time Tn since the difference between the communication delay times of the forward and return packet paths is negligible in implementation.

The transmission operation delay time Tds and the reception operation delay time Tdr are added to the obtained pure communication delay time Tn to obtain a one-way communication delay time Tc and the one-way communication delay time Tc is then set as a monitor delay time Tm.

The measured communication delay times of the session terminals B to D may differ. However, in this case, one of the following values may be appropriately employed as the communication delay time:

(1) An average of the communication delay times.

(2) The maximum of the communication delay times.

(3) Although the maximum is basically employed, a threshold Tt, which is a delay time in a range at which session performance is practically possible, is employed when the maximum exceeds the threshold Tt.

(4) A different delay time is set for each of the session terminals B to D (a detailed example of which is described later).

When the session starts, an instruction to reproduce back performance sound is issued and desired back performance data to be reproduced is read from the storage device 4 upon issuance of the instruction in the session terminal A as shown in a functional block diagram of FIGS. 4(2) (A1), and back performance information Bp corresponding to the desired back performance data is transmitted to the session terminals B to D and reproduction of the back performance sound in the session terminal A is delayed by a set monitor delay time Tm (A2 and A3). That is, when the monitor delay time Tm has elapsed (A2) after the back performance reproduction is instructed (A1), the session terminal A allows the tone generation/effect circuit 9 to start emitting the back performance sound based on reproduction of the back performance data (A3).

Each of the session terminals B to D receives back performance information Upa corresponding to the back performance data reproduced by the session terminal A with a delay of the communication delay time Tc from the reproduction instruction and reproduces the received back performance information Upa and emits a corresponding back performance sound (B1 to D1). Then, when users of the session terminals B to D play musical instrument performance and/or singing while listening to the back performance (B2 to D2), the session terminals B to D emit corresponding user performance sounds (B3 to D3) while transmitting user performance information Upb to Upd representing content of the musical instrument performance and/or singing to the session terminal A.

The user of the session terminal A can also play musical instrument performance and/or singing while listening to the back performance sound reproduced by the session terminal A (A4). While the user of the session terminal A plays musical instrument performance and/or singing, the session terminal A also transmits the user performance information Upa representing content of the musical instrument performance and/or singing to the session terminals B to D. The back performance sound of the terminal A is emitted with a delay of the monitor delay time Tm after the instruction to reproduce back performance is issued. However, since this delay Tm is almost the same as the delay Tc in the case where the session terminal A functions as a second session terminal, the user of the session terminal A does not perceive influence of the difference between the delay Tm and the delay Tc. In addition, the user performance sound data corresponding to the content of the musical instrument performance and/or singing played by the user of the session terminal A is mixed with the back performance sound data (Bp), the user performance sound data corresponding to the user performance information Upb to Upd received from the other session terminals B to D (A5), and the like (A5) and a session performance sound generated by combining these pieces of performance sound data is emitted, record, and/or transmitted (A6).

In this manner, each of the session terminals B to D emits sound of the musical instrument performance and/or singing played on the session terminal A (B3 to D3) with a delay of the monitor delay time Tm after the back performance sound is emitted (B1 to D1) and the users of the session terminals B to D additionally play musical instrument performance and/or singing while listening to the emitted musical instrument performance and/or singing sound. The sound of the musical instrument performance and/or singing of the user of the session terminal A is emitted in the session terminals B to D with a delay of the monitor delay time Tm approximately equal to the communication delay time Tc after back performance. However, if the monitor delay time Tm is less than an allowable time (for example, 30 ms), the users of the session terminals B to D can play musical instrument performance and/or singing without feeling much strangeness. In addition, the session terminal A also emits sounds of the musical instrument performance and/or singing played on the session terminals B to D by the users of the session terminals B to D (A6) with a delay of the communication delay time Tc after the back performance sound is emitted (A3). However, if the communication delay time Tc is less than an allowable time (for example, 30 ms), the user of the session terminal A can play musical instrument performance and/or singing without feeling much strangeness as in the session terminals B to D.

If no monitor delay is added to the session terminal A, other user performance sounds generated by musical instrument performance and/or singing by the users of the session terminals B to D are emitted at the session terminal A with a serious delay corresponding to a round-trip communication delay 2Tc (for example, about 60 ms) although a user performance sound generated by musical instrument performance and/or singing by the user of the session terminal A and the user performance sounds generated by musical instrument performance and/or singing by the users of the session terminals B to D are emitted at almost the same time at the session terminals B to D as described above with reference to FIG. 1(2). Since the monitor delay Tm is added to this system, the delay of sound of performance played on the session terminal A by the user of the session terminal A is reduced by half and the delay of the user performance sound of the session terminal A and the delays of the user performance sounds of the session terminals B to D are equalized (i.e., the delays are approximately equal between a case when the session terminals A to D function as first session terminals and another case when the session terminals A to D function as second session terminals), thereby reducing strangeness.

A detailed setting example in the case where different delay times are set in the session terminals B to D (i.e., in the above case (4)) is described below. The maximum of the measured communication delay times of the session terminals or the above-described predetermined threshold Tt (see the above case (3)) is set as the monitor delay time Tm of the session terminal A. The back performance information Bp is transmitted to each of the session terminals B to D after waiting for "monitor delay time—communication delay time Tc". Here, in the case where the predetermined threshold Tt has been set, the communication delay time Tc is replaced with the predetermined threshold Tt if the communication delay time Tc exceeds the threshold Tt.

For example, when the communication delay times Tc between the session terminal A and the session terminals B, C, and D are 20 ms, 40 ms, and 60 ms, the monitor delay time Tm of the session terminal A is set to the maximum "60 ms" ("50 ms" when the threshold Th is set to "50 ms") and the back performance information Bp is transmitted to the session terminal B after being delayed by 40 ms (=60 ms−20 ms) (30 ms (=50 ms−20 ms) when the threshold Th is set to 50 ms), is transmitted to the session terminal C after being delayed by 20 ms (=60 ms−40 ms) (10 ms (=50 ms−40 ms) when the threshold Th is set to 50 ms), and is transmitted to the session terminal D after being delayed by 0 ms (=60 ms-60 ms) (0 ms (=50 ms-50 ms) when the threshold Th is set to 50 ms) (i.e., without being delayed). This allows each session terminal to play back performance at almost the same time.

Various Embodiments

Although basic exemplary operations of the network session system have been described with reference to the above embodiment of the invention, various other embodiments may be employed. FIGS. 5(1) and 5(2) are functional block diagrams illustrating various embodiments of a network session system according to the invention. For example, in the case where back performance is played on the session terminal A and musical instrument performance is performed on each of the above session terminals A to D, back performance data prepared in the terminal A may be in a MIDI format and may be transmitted as back performance information Bp in the same MIDI format to the other terminals B to D, and user performance information Upa and user performance information Upb to Upd in a MIDI format generated by the terminal A and the terminals B to D may be transmitted to the other terminal B and terminals D to A as shown in FIG. 5(1). In addition, performance sound data (A2a and A5c) and (B3c) converted into an audio format by the tone generation unit in the tone generation/effect circuit 9 in the terminal A and the terminals B to D may be transmitted as back performance information Bp or as user performance information Upa and user performance information Upb to Upd to the other terminals B to D and terminal A as shown in FIG. 5(2).

In the case where performance information Bp and Up is transmitted in a MIDI format as shown in FIG. 5(1), each receiving-side session terminal performs sound emission (A3, B1) and (A6, B3) of the performance information Bp and Up received in the MIDI format (A3, B1) and (A6, B3) after converting the performance information Bp and Up into an audio format (A3a, B1a) and (A5b, B3b) at the tone generation unit (9). In addition, in the case where monitor delay Tm is added to the session terminal A, the back performance data may be delayed in the same MIDI format without being converted (A1→A2) as shown in FIG. 5(1) and may also be delayed after being converted into an audio format at the tone generation unit in the tone generation/effect circuit 9 (A2a→A2) as shown in FIG. 5(2).

In addition, in the case where singing is played in each of the session terminals A to D, it is preferable that a headphone be used to emit back performance sound so as to prevent the emitted back performance sound from being collected by the microphone 14. For example, if an emitted back performance sound is collected by the microphone in the session terminal B and the collected back performance sound is transmitted to the session terminal A, there is a problem in that a back performance sound reproduced in the session terminal A is mixed with the user performance information Upb received from the session terminal B with a delay of the communication delay time Tc.

It is also possible to allow a user to select the manner by which the monitor delay Tm is inserted. For example, the monitor delay time Tm may be automatically set according to the measured communication delay time Tc. The user may also be allowed to set the monitor delay time Tm with reference to the measured communication delay time Tc. In the case where the monitor delay time Tm is automatically set, ½ of the round-trip delay time (2×Tc) of the communication path may be set as the monitor delay time Tm and the one-way delay time may also be directly set as the monitor delay time Tm as described above. In the case where the communication delay time Tc exceeds a delay time causing strangeness, the display device 15 or the like may be used to notify the user of the fact that it is difficult to establish a session.

In addition, in the case where the session terminals A to D are electronic musical instruments, a certain amount of performance delay Tp, whose upper limit is the monitor delay time Tm or the communication delay time Tc, may be inserted between performance manipulation (A4, B2) of the performance manipulator 13 by the user and initiation of generation (A5b, B3c) of user performance sound data by the tone generation unit in the tone generation/effect circuit 9 or between user performance sound data generation (A5c, B3b) and user performance sound emission (A6, B3) as indicated by dashed blocks A5a and B3a and dashed blocks A5b and B3d to which a symbol ":X:" is attached in FIGS. 5(1) and 5(2). This can reduce the time difference between generation of a user performance sound (monitor sound) corresponding to musical instrument performance of the user of the session terminal and generation of a user performance sound corresponding to musical instrument performance of another terminal user that has been received from said another session terminal. However, since some users may feel strangeness due to a delay between performance manipulation and sound generation, it is preferable that the value of the performance delay Tp not be large as described above.

What is claimed is:

1. A method of performing a sound performance by reproducing sound performance information with using a communication interface, comprising:

transmitting, by a first terminal, first sound performance information to the communication interface to one or more second terminals in response to an instruction;

reproducing, by the first terminal, the first sound performance information after a predetermined time elapsed from issuance of the instruction, wherein the predetermined time is based on at least one communication delay time between the first terminal and one of the one or more second terminals;

generating, by the first terminal, second sound performance information based on a user-performed sound performance, which is performed by a user during the reproducing of the first sound performance information;

reproducing, by the first terminal, the generated second sound performance information; and transmitting, by the first terminal, the generated second sound performance information to the communication interface to one or more of the one or more second terminals.

2. The method according to claim 1, wherein the instruction is inputted to commence the reproducing of the first sound performance information.

3. The method according to claim 1, wherein the first sound performance information is stored in a storage medium, and the first sound performance information is read out from the storage medium in response to the instruction.

4. The method according to claim 1, wherein the second sound performance information is generated in response to detection of a performance operation inputted by a user.

5. The method according to claim 1, wherein the second sound performance information is generated in synchronization with the reproducing of the first sound performance information.

6. The method according to claim 1, further comprising receiving third sound performance information from one or more of the one or more second terminals through the communication interface and reproducing the received third sound performance information.

7. A first terminal apparatus for performing a sound performance by reproducing sound performance information with using a communication interface to one or more second terminal apparatuses, the first terminal apparatus comprising one or more processors configured to control the first terminal apparatus to:
  transmit first sound performance information to the communication interface to one or more of the one or more second terminal apparatuses in response to an instruction;
  reproduce the first sound performance information after a predetermined time elapsed from issuance of the instruction, wherein the predetermined time is based on at least one communication delay time between the first terminal apparatus and one of the one or more second terminal apparatuses;
  generate second sound performance information based on a user-performed sound performance, which is performed by a user during the reproducing of the first sound performance information; and
  reproduce the generated second sound performance information; and
  transmit the generated second sound performance information to the communication interface to one or more of the one or more second terminal apparatuses.

8. A machine readable non-transitory storage medium for use in a first terminal apparatus having a processor, the storage medium containing program instructions being executable by the processor to enable the first terminal apparatus to perform a sound performance process comprising:
  transmitting first sound performance information to a communication interface to one or more second terminal apparatuses in response to an instruction;
  reproducing the first sound performance information after a predetermined time elapsed from issuance of the instruction, wherein the predetermined time is based on at least one communication delay time between the first terminal apparatus and one of the one or more second terminal apparatuses;
  generating second sound performance information based on a user-performed sound performance, which is performed by a user during the reproducing of the first sound performance information; and
  reproducing the generated second sound performance information; and
  transmitting the generated second sound performance information to the communication interface to one or more of the one or more second terminal apparatuses.

* * * * *